(12) United States Patent
Jeong et al.

(10) Patent No.: US 9,043,566 B2
(45) Date of Patent: May 26, 2015

(54) METHOD AND APPARATUS FOR OPTICALLY BACKING UP DATA

(75) Inventors: Soon-gyu Jeong, Suwon-si (KR); Young-woo Lee, Suwon-si (KR); Hoo-seung Lee, Seoul (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 153 days.

(21) Appl. No.: 13/368,451

(22) Filed: Feb. 8, 2012

(65) Prior Publication Data

US 2012/0311281 A1 Dec. 6, 2012

(30) Foreign Application Priority Data

Jun. 2, 2011 (KR) .................. 10-2011-0053374

(51) Int. Cl.
*G06F 12/00* (2006.01)
*G06F 11/14* (2006.01)
*H04L 29/08* (2006.01)

(52) U.S. Cl.
CPC ........ *G06F 11/1456* (2013.01); *G06F 11/1464* (2013.01); *H04L 67/1097* (2013.01)

(58) Field of Classification Search
USPC .......................................................... 711/162
See application file for complete search history.

(56) References Cited

U.S. PATENT DOCUMENTS

| | | | |
|---|---|---|---|
| 6,044,436 A * | 3/2000 | Otsuka | 711/112 |
| 6,449,737 B1 * | 9/2002 | Tanaka et al. | 714/38.1 |
| 6,829,624 B2 * | 12/2004 | Yoshida | 707/205 |
| 2004/0088440 A1 * | 5/2004 | Chen et al. | 710/1 |
| 2006/0190505 A1 * | 8/2006 | DeMaio et al. | 707/204 |
| 2008/0126929 A1 | 5/2008 | Bykov | |
| 2009/0020602 A1 * | 1/2009 | Pratone | 235/380 |
| 2009/0110375 A1 * | 4/2009 | Shimizu et al. | 386/126 |
| 2010/0332777 A1 * | 12/2010 | Tsai et al. | 711/162 |
| 2011/0019007 A1 * | 1/2011 | Elazar et al. | 348/207.1 |
| 2011/0035465 A1 * | 2/2011 | Kuwata et al. | 709/217 |
| 2011/0231177 A1 * | 9/2011 | Chiang | 703/21 |
| 2011/0234607 A1 * | 9/2011 | Katsukura et al. | 345/522 |

FOREIGN PATENT DOCUMENTS

| | | | |
|---|---|---|---|
| KR | 10-0571887 B1 | * | 4/2006 |
| KR | 10-2008-0025825 A | * | 3/2008 |
| KR | 10-2009-0015157 A | * | 2/2009 |
| KR | 10-2010-0118044 | * | 11/2010 |

OTHER PUBLICATIONS

Translation of IDS Korean Office Action issued on Jun. 17, 2013 for Korean Application No. 10-2011-0053374.*
Korean Office Action issued Jun. 17, 2013 in Korean Patent Application No. 10-2011-0053374 (4 pages, in Korean).
Korean Office Action issued Dec. 9, 2013 in counterpart Korean Patent Application No. 10-2011-0053374. (4 pages in Korean).

* cited by examiner

*Primary Examiner* — Charles Rones
*Assistant Examiner* — Nanci Wong
(74) *Attorney, Agent, or Firm* — NSIP Law (57) ABSTRACT

An optical backup apparatus is provided and includes an optical storage device, an interface module to connect with at least one type of external storage medium, and a control unit to back up data from the external storage medium to the optical storage device in response to an external remote control operation.

26 Claims, 7 Drawing Sheets

METHOD AND APPARATUS FOR OPTICALLY BACKING UP DATA

CROSS-REFERENCE TO RELATED PATENT APPLICATION

This application claims the benefit under 35 U.S.C. §119 (a) of Korean Patent Application No. 10-2011-0053374, filed on Jun. 2, 2011, in the Korean Intellectual Property Office, the disclosure of which is incorporated herein in its entirety by reference for all purposes.

BACKGROUND

1. Field

The following description relates to a method and apparatus for optically backing up data.

2. Description of the Related Art

Generally, an optical disc apparatus may be used as a primary source of not only computers but also various types of contents reproducing devices. The optical disc apparatus may be of an embedded type or a detached type and may be connected to a host apparatus via an interface of various types.

The optical disc apparatus may be used to reproduce and record information. As such, an apparatus having various functions by using the optical disc apparatus may be embodied.

SUMMARY

In one general aspect, there is provided an optical backup apparatus that may include an optical storage device, an interface module to connect with at least one type of external storage medium, and a control unit to back up data from the external storage medium to the optical storage device in response to an external remote control operation.

The optical storage device may include an optical disc drive.

The optical backup apparatus may further include a communication unit having at least one of a wired module and a wireless module.

The interface module may support at least one of a universal serial bus (USB) memory and a secure digital (SD) memory card.

In another general aspect, there is provided an optical backup apparatus to communicate with a remote terminal configured to externally and remotely control back up data that may include an optical disc drive, an interface module to connect with at least one type of external storage medium, a control unit to perform a control operation related to the optical disc drive and the external storage medium, and a communication unit to exchange information between the control unit and the remote terminal, wherein in response to a signal from the control unit, the remote terminal controls the control unit to back up data from the external storage medium to the optical disc drive.

The communication unit may include at least one of a wired module and a wireless module.

The wireless module may support at least one of Wi-Fi and Bluetooth.

The wireless module may support at least one of Wi-Fi and Bluetooth.

The remote terminal may include an application to control the backup.

The interface module may support at least one of a universal serial bus (USB) memory and a secure digital (SD) memory card.

In another general aspect, there is provided a method of optically backing up data, the method may include controlling a control unit connected to a remote controller via a wired or wireless connection, operating an optical disc drive by using the control unit, and backing up data from an external storage device to the optical disc drive, wherein the external storage device connects to the control unit via a wired connection.

The remote controller and the control unit may be connected over Wi-Fi or Bluetooth.

The remote controller may include an application to control the backup.

The external storage device may connect to the control unit via an interface module of a universal serial bus (USB) memory or a secure digital (SD) memory card.

In another general aspect, there is provided a method of performing data backup in an optical backup apparatus that may include transmitting a request to a control unit in the optical backup apparatus via a remote terminal, the request corresponding to information regarding a status of a storage device provided in the optical backup apparatus and an external storage medium, and receiving the results of the request via the remote terminal, wherein based on the results, the remote terminal controls the control unit to perform a data backup operation from the external storage medium to the storage device.

The storage device may be an optical disc drive.

The remote terminal may be configured with an application to control the control unit to perform the data backup operation.

The control unit may be configured to transmit status information about the data backup operation to the remote terminal.

The method may further include requesting via the remote terminal a list of backup target files of the external storage medium to allow a user of the remote terminal to select a backup target file.

The method may further include starting via the control unit the data backup operation when the user selects the backup target file.

The control unit may be configured to check a size of the backup target file and storage capacity of the storage device.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
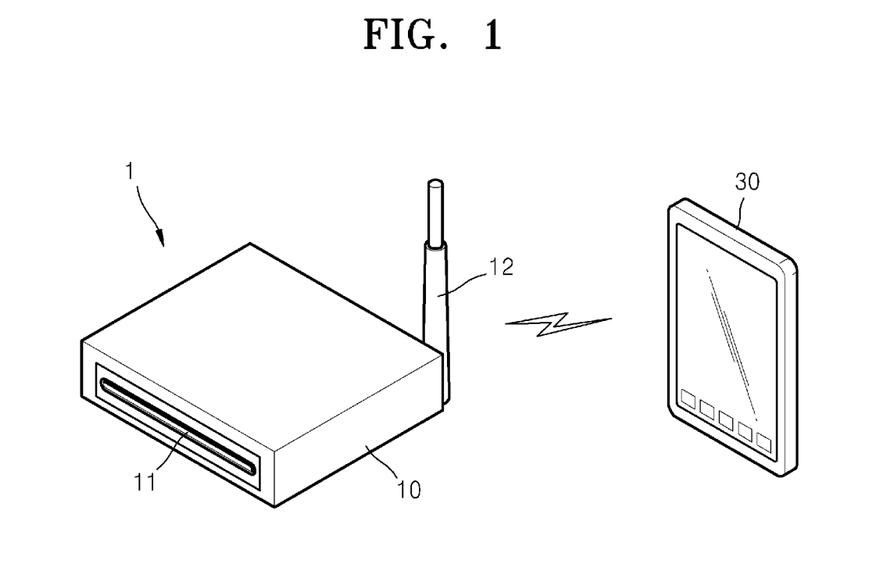
FIG. 1 is a diagram of a wireless optical disc apparatus according to an example embodiment.
Figure 2:
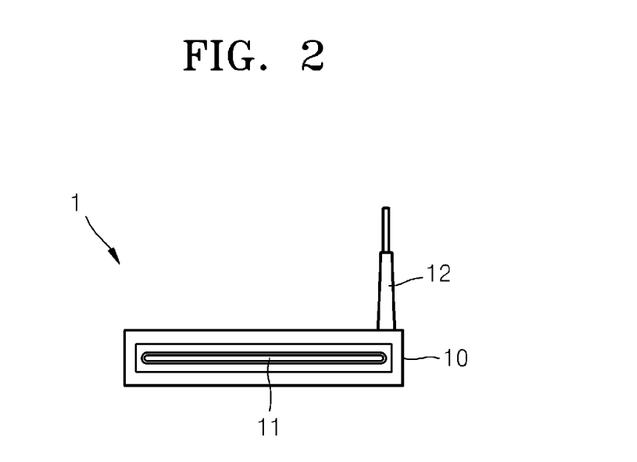
FIG. 2 is a diagram of the wireless optical disc apparatus.
Figure 3:
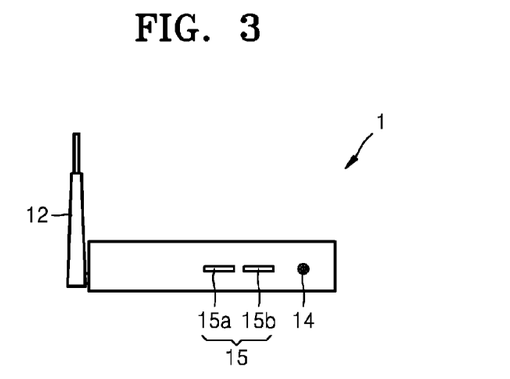
FIG. 3 is a diagram of the wireless optical disc apparatus.

FIG. 1 is a diagram of an optical backup apparatus 1 according to an example embodiment. FIG. 2 and FIG. 3 are also diagrams of the optical backup apparatus 1.

Referring to FIGS. 1 through 3, the optical backup apparatus 1 may include an optical disc drive 11 which for example, may be an optical storage device. The optical backup apparatus may include a housing 10 to accommodate the optical disc drive 11, and an antenna unit 12. The antenna unit 12 may be mounted at a side of the housing 10 for wireless communication with an external remote terminal 30. According to an aspect of an example embodiment, however, the antenna unit 12 for communication with the external remote terminal 30 may be embedded in the housing 10 and may include two or more antennas.

The optical backup apparatus 1 may be of a tray type or a slot-in type, however, an aspect of an example embodiment may not be limited thereto.

The optical backup apparatus 1 may also include an external power connecting jack 14 arranged at a rear side of the housing 10. Also, a wired terminal 13 (not shown in FIG. 3) for connection with a separately wired remote terminal and a socket device 15 may be arranged at the rear side of the housing 10. The wired terminal 13 may be a part of a wired module 24b to be described later in FIG. 4. The socket device 15 may include a universal serial bus (USB) socket 15a and a secure digital (SD) memory card socket 15b for connection with, for example, an external storage device (see FIGS. 4 and 7).

Figure 4:
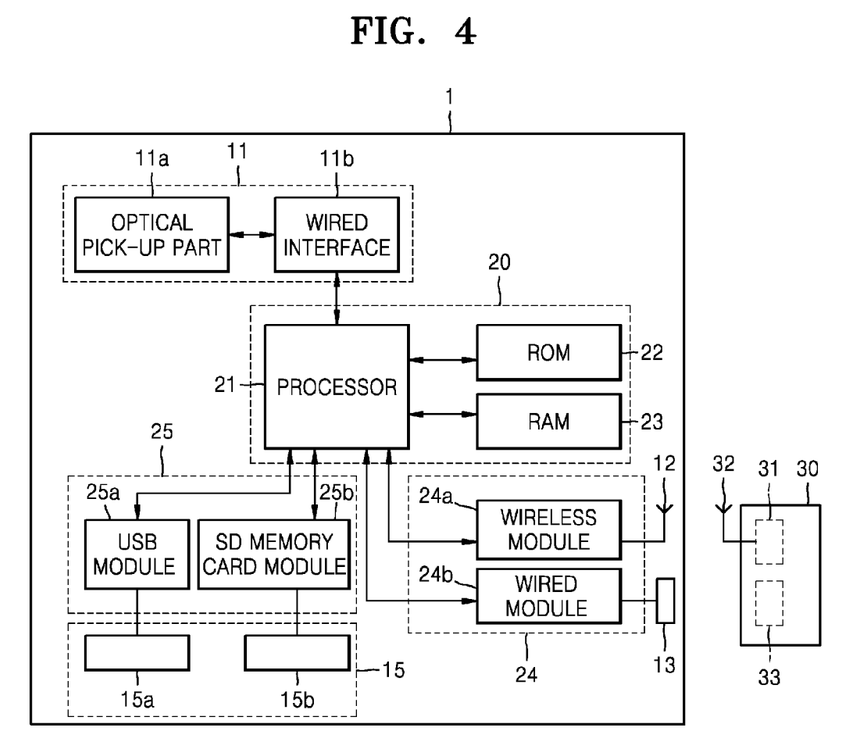
FIG. 4 is a block diagram of the wireless optical disc apparatus.

FIG. 4 is a block diagram of the optical backup apparatus 1.

Referring to FIG. 4, the optical backup apparatus 1 may include the optical disc drive 11, a control unit 20, a communication unit 24, and an interface module 25 for connection with an external storage device. The optical disc drive 11 may include an optical pick-up part 11a and a wired interface 11b. The optical disc drive 11 may be connected to the control unit 20 via the wired interface 11b of, for example, a Serial Advanced Technology Attachment (SATA) type or USB type. The control unit 20 includes a processor 21, a read-only memory (ROM) 22, and a random-access memory (RAM) 23, and may have a system-on-chip (SOC) structure. The processor 21 may be configured to load an operating system (OS) program stored in the ROM 22, which has a flash memory structure, by using the RAM 23 as a buffer memory, and may perform data processing such as a read operation or a write operation with respect to the optical disc drive 11. The processor 21 may be configured to output a result via the communication unit 24 having the wired module 24b and a wireless module 24a. The communication unit 24 may include the wireless module 24a or the wired module 24b for communication with the external remote terminal 30. The external remote terminal 30 may include an antenna 32 connected to an embedded wireless module 31 to correspond to the wireless module 24a of the optical backup apparatus 1. According to another example embodiment, the external remote terminal 30 may include an embedded wired module 33 that corresponds to the wired module 24b of the optical backup apparatus 1.

The wireless module 24a and the wired module 24b of the communication unit 24 may output data provided by the processor 21 or may deliver data including a command delivered from the external remote terminal 30 to the processor 21. The wireless module 24a of the communication unit 24 may support Universal Plug and Play (UPnP)/UPnP AV/Digital Living Network Alliance (DLNA) protocols, and thus, may share multimedia data with audio-video (AV) devices in a network.

Figure 7:
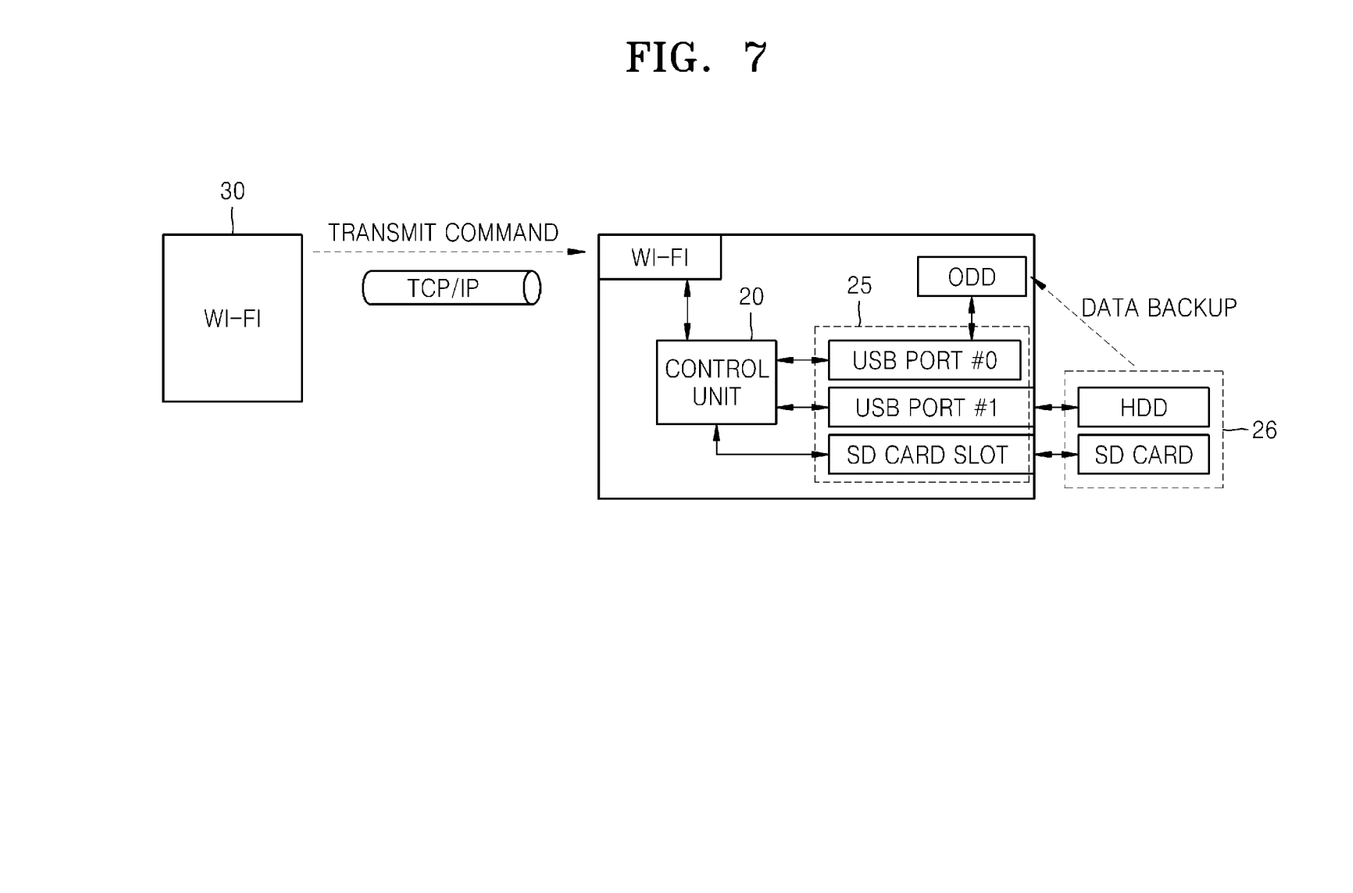
FIG. 7 is a block diagram of a wireless optical disc apparatus according to another example embodiment.

The interface module 25 may include a USB module 25a and an SD memory card module 25b to which an external storage device 26 as shown in FIG. 7 may be connected. The USB socket 15a and the SD memory card socket 15b may be connected to the USB module 25a and the SD memory card module 25b, respectively. Thus, in addition to the optical disc drive 11, an example embodiment may use a memory stick or a USB memory as the external storage device 26. For example, the memory stick, the USB memory, and an SD memory card may be used as the external storage device 26 and provide source data for backup in the optical disc drive 11.

Accordingly, the external remote terminal 30 connected via the communication unit 24 may access not only the optical disc drive 11 but also the external storage device 26 such as the memory stick, the USB memory, or the like. With respect to the access to the external storage device 26, the external remote terminal 30 may perform the access by using a protocol such as Internet Small Computer System Interface (iSCSI), Server Message Block (SMB)/Common Internet File System (CIFS), UPnP, and the like. The external remote terminal 30 may include a remote application for backup of data from the external storage device 26 to the optical disc drive 11. According to an aspect, when performing a control operation for a backup operation, the remote application may perform a control procedure of the control unit 20 on backup target contents without a request from a user. In this regard, the remote application may be configured to provide a user interface to select an external storage device, obtain a backup target list, select a backup target from the backup target list, and perform a backup execution command.

The external remote terminal 30 that may be accessible via the communication unit 24 may be a smart television (TV) supporting wired/wireless communication, a computer, a personal information terminal including a personal digital assistant (PDA), a personal multimedia reproducer including a portable media player (PMP), a tablet personal computer (tablet PC), an MP3 player, and the like.

The wireless module 24a that may be configured to perform communication with a wireless terminal apparatus such as the external remote terminal 30 may use a communication protocol such as Wi-Fi or Bluetooth for processing data via a wireless connection. Bluetooth version 2.0, or 3.0, or one of versions 1.0/1.1/1.2/2.0/2.1/3.0/4.0 or the like may be used. Also, Wi-Fi may be WiFi IEEE 802-11g/b/n or WI-FI direct.

Figure 5:
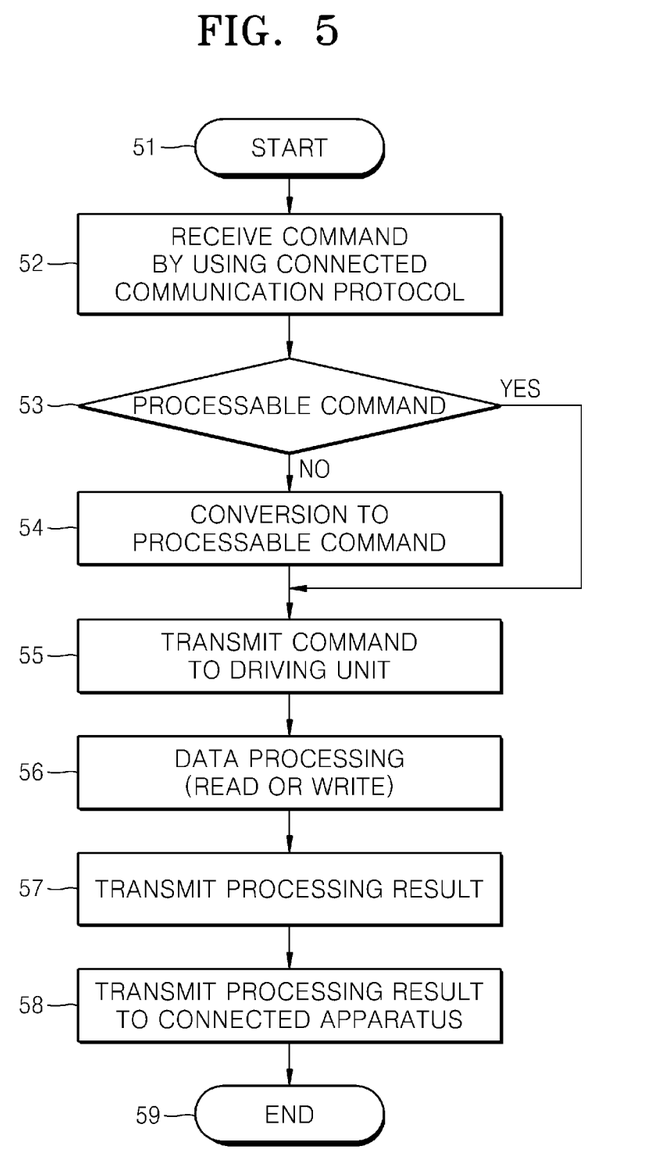
FIG. 5 is a diagram of the wireless optical disc apparatus, according to an example embodiment.

FIG. 5 is a diagram of the optical backup apparatus 1 via a wireless module, according to an example embodiment.

When an operation of the optical backup apparatus 1 having a function of a wireless optical disc apparatus starts (operation 51), a request command from a wireless terminal apparatus may be received by using a communication protocol via the wireless module 24a of the communication unit 24 (operation 52).

The received request may be read and then it may be determined whether data may be processed by the optical backup apparatus 1 or the external storage device 26 (operation 53).

If a command may be processed by the optical backup apparatus 1 or the external storage device 26, the command may be directly transmitted to the processor 21. If the command cannot be processed, that is, if the requested command or the data does not comply with ATA/ATAPI protocols, the requested command or the data may be converted into a processable command (operation 54) and then transmitted to the processor 21 (operation 55).

According to the command from the wireless module 24a, the processor 21 may perform data processing such as a read operation or a write operation by using the external storage device 26 (operation 56), and may transmit a result thereof to a communication unit 24 (operation 57). The communication unit 24 may transmit the result to the wireless terminal apparatus by using the communication protocol via the wireless module 24a, and then end the entire process (operation 59).

With respect to the connection with the wireless terminal apparatus via the wireless module 24a, the connection may be established over Wi-Fi. The Wi-Fi connection via the wireless module 24a may be according to iSCSI, SMB/CIFS, UPnP, or the like. Generally, the standard storage networking of iSCSI may perform communication via transmission control protocol (TCP) ports 860 and 3260. SMB may be used in a sharing of a file, a printer, or the like, and may be a protocol that uses a TCP port 445. UPnP may be a technology that allows various peripheral devices including a personal PC, a printer, or the like to access a home network and to be shared among many users. General devices may have their own Internet protocol (IP) addresses and may use IP protocols such as TCP/IP, a Dynamic Host Configuration Protocol (DHCP), or the like for communication among each other. The implementation of these devices may be achieved by using an Extensible Markup Language (XML). An existing PnP may allow a PC to access peripheral devices but the UPnP may be configured to extend such an access for applications in the home network.

Figure 6:
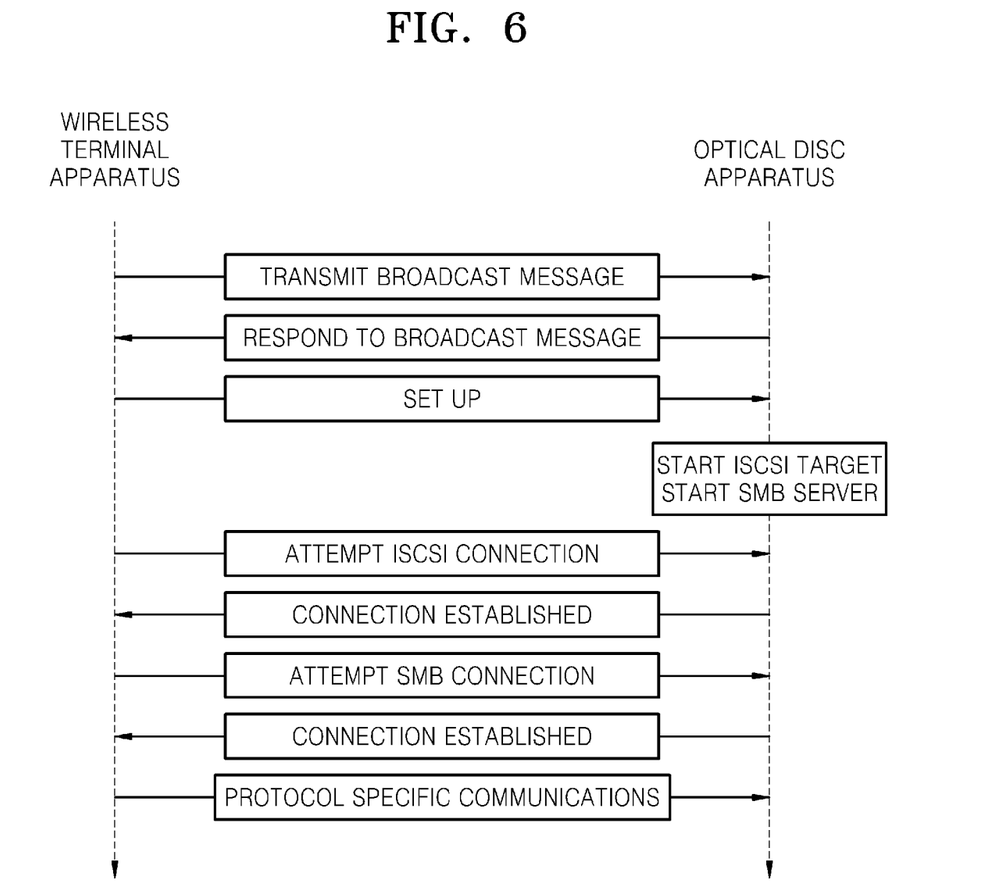
FIG. 6 is a diagram illustrating a message transmission procedure for connection between a wireless terminal apparatus and an optical disc apparatus, according to an example embodiment.

FIG. 6 is a diagram illustrating a message exchange and a setup process in a Wi-Fi connection process between the optical backup apparatus 1 and a wireless apparatus, according to an example embodiment.

Referring to FIG. 6, the wireless apparatus (or a terminal) may transmit a broadcast message to the optical backup apparatus 1 so as to search for the optical backup apparatus 1. The optical backup apparatus 1 may respond to the broadcast message from the wireless apparatus. Then, the wireless apparatus may set up the optical backup apparatus 1. As such, the optical backup apparatus 1 may start an iSCSI target. If an external storage device is detected, the optical backup apparatus 1 may start an SMB server. Afterward, the wireless apparatus may establish an iSCSI connection with the optical backup apparatus 1 via a TCP port 3260, and may also establish SMB connection with the external storage device via a TCP port 445, so that protocol specific communications may be achieved.

FIG. 7 is a diagram illustrating a relation between the external remote terminal 30 and a main body of the backup apparatus 1 when data may be backed up from the external storage device 26 to the optical disc drive 11.

Referring to FIG. 7, the external remote terminal 30 may transmit a command from the control unit 20 over Wi-Fi, and the control unit 20 backs up data from the external storage device 26 to the optical disc drive 11. An application to drive the external remote terminal 30 may be embedded in the external remote terminal 30 in order to provide the backup.

When loading a backup application to the external remote terminal 30, a backup command may be performed via a user interface displayed on the external remote terminal 30. This procedure according to an example embodiment will now be described with reference to FIGS. 8 and 9.

Figure 8:
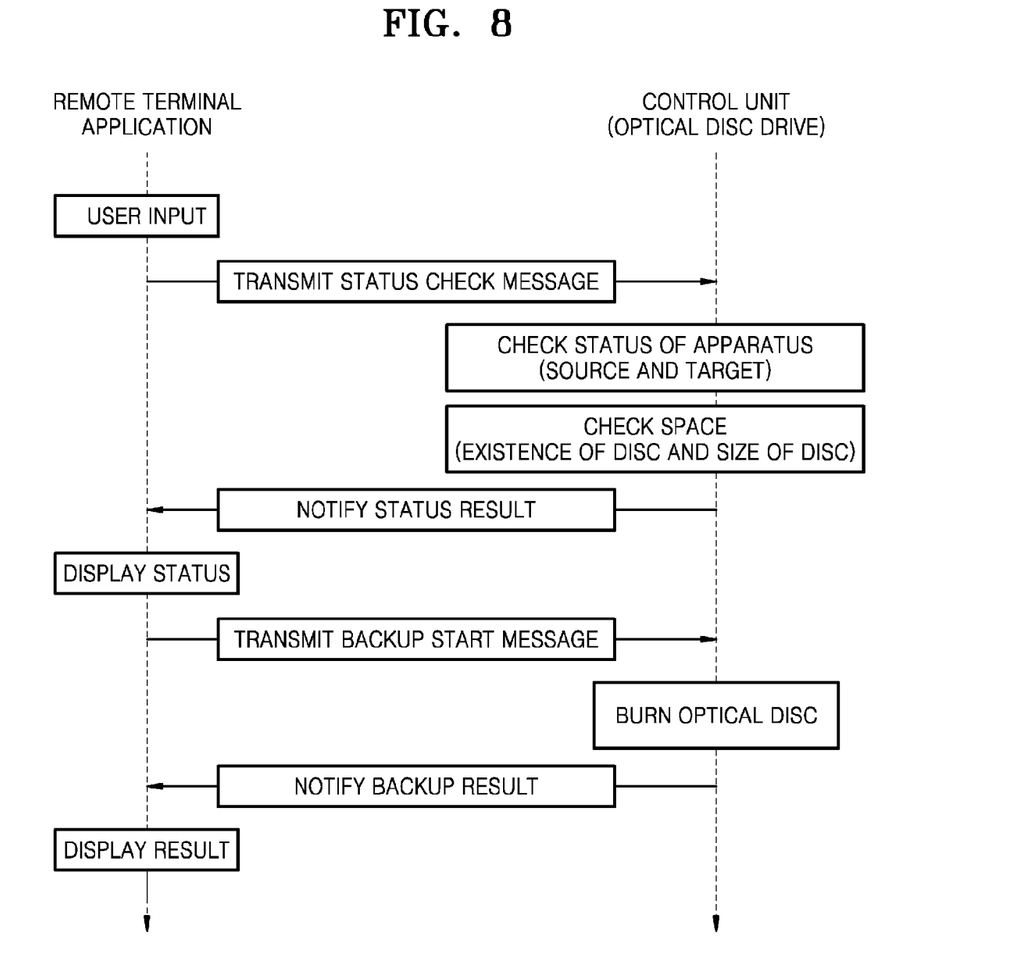
FIG. 8 is a diagram illustrating a use status of a wireless terminal apparatus and a wireless optical disc apparatus to which an external storage device may be connected.

Referring to FIG. 8, while the external remote terminal 30 and the control unit 20 connect to each other by the communication unit 24 in a wired or wireless manner, a user via a user interface may input user information for backup initialization using a backup application. The user information may be transmitted to the control unit 20 as a status check message. The control unit 20 may then check a status of an internal system. The control unit 20 may check the status of the internal system by performing a checking of a source such as the external storage device 26, checking of a status of a target such as the optical disc drive 11, and checking of a storage space.

According to an example embodiment, the status checking may be configured to determine whether the optical disc drive 11 may be capable of performing backup. The status checking may include checking the existence and status of a source such as a USB memory, a memory stick, or a hard disk drive, and the existence and status of the optical disc drive 11 that performs backup. When performing the status checking, a size of backup target data and a capacity of an optical disc to be inserted into the optical disc drive 11 may be simultaneously compared and checked. The control unit 20 may transmit a result of the status checking to a wireless terminal apparatus. The external remote terminal 30 may then display the result of the status checking on a display. Afterward, the user may transmit a backup start message via the user interface. In response to the backup start message, the control unit 20 may store, by way of a burning operation, data of the external storage device 26 to the optical disc. When completing the burning operation with respect to the optical disc, the control unit 20 may transmit a result of the burning operation to the wireless terminal apparatus of the external remote terminal 30. The external remote terminal 30 may then display the result.

Figure 9:
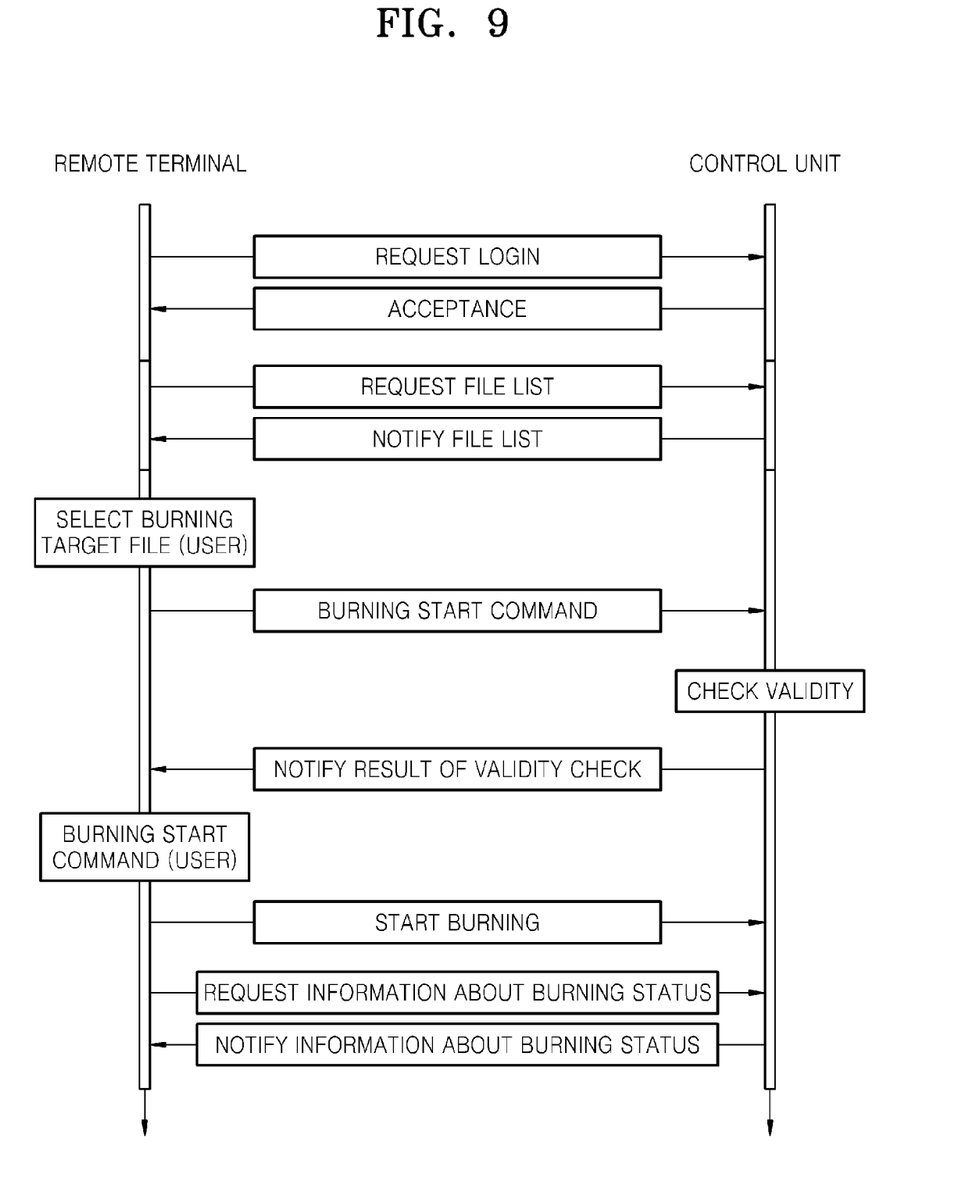
FIG. 9 is a diagram illustrating a message transmission procedure when an optical disc apparatus may be used as a backup apparatus of an external storage device.

FIG. 9 is a diagram illustrating a detailed backup procedure.

Referring to FIG. 9, an external remote terminal may send a login request to a control unit, and the control unit accepts connection. After establishing the connection, the external remote terminal may request information about an external storage device, and a list of backup target files of the external storage device. The control unit may transmit the requested information and the list of backup target files of the external storage device.

According to an example embodiment, the external remote terminal may display a type of external storage device to the user and the list of backup target files on a display so as to allow a user to select the backup target files. When the user selects a file, information about the selected backup target file may be transmitted to the control unit to start the burning of the target file. The control unit may then determine validity with respect to whether the selected backup target file may be backed up. The control unit may then transmit a result of the determination to the external remote terminal.

According to an example embodiment, the external remote terminal may display information about the validity. If the selected backup target file may be backed up, the external remote terminal may provide a backup start command button on the display. The backup start command, that is, a burning start command, may be transmitted to the control unit by the user so that a disc burning operation, i.e., backup, may be performed by an optical disc drive controlled by the control unit. Here, the external remote terminal may request information about a status of the burning operation. In response to the request, the control unit may transmit status information about the burning operation to the external remote terminal. When completing the burning operation, backup complete information may be transmitted to the external remote terminal as the status information about the burning operation. The external remote terminal may then display the backup complete information on a display.

According to an example embodiment as described above, an apparatus for performing data backup on the optical backup apparatus by a wired or wireless control may back up data from the external storage device including a USB memory or a SD memory card to the optical disc drive by a remote control operation. The external remote terminal may be not only a PC but also a mobile device such as a tablet PC, a smart phone, a PMP, a PDA, or the like, so that data of portable storage devices may be safely and conveniently backed up.

As a non-exhaustive illustration only, a terminal described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of performing data backup in an optical backup apparatus, comprising:
   accepting a connection in response to a login request from a remote terminal;
   transmitting information requested by a user about an external storage medium and a list of backup target files of the external storage medium to be displayed by the remote terminal in response to a user selection of the backup target files;
   transmitting a request to a control unit in the optical backup apparatus via the remote terminal, the request corresponding to information regarding a status of a storage device provided in the optical backup apparatus and information regarding a status of the external storage medium; and
   receiving the results of the request via the remote terminal in response to determining whether the request is in a form that is capable of being processed by the optical backup apparatus or the external storage medium, and converting the request into a processable command in response to the request not being in a form that is capable of being processed by the optical backup apparatus or the external storage medium,
   wherein based on the results and a check of an existence and the status of the external storage medium, a status of the optical backup apparatus, and the status of the storage device that is simultaneous with a comparison between a size of target files and a capacity of the storage device, the remote terminal controls the control unit to perform a data backup operation of the backup target files from the external storage medium to the storage device.

2. The method of claim 1, wherein the storage device is an optical disc drive.

3. The method of claim 1, wherein the remote terminal is configured with an application to control the control unit to perform the data backup operation.

4. The method of claim 1, wherein the control unit is configured to transmit status information about the data backup operation to the remote terminal.

5. The method of claim 1, further comprising requesting via the remote terminal a list of potential backup target files of the external storage medium to allow a user of the remote terminal to select the backup target files.

6. The method of claim 5, further comprising starting via the control unit the data backup operation in response to the user selecting the backup target files.

7. The method of claim 6, wherein the control unit is configured to check a size of the backup target files and the storage capacity of the storage device.

8. An optical backup apparatus comprising:
   an optical storage device;
   an interface module configured to connect with a type of external storage medium;
   a control unit configured to
      accept a connection in response to a login request from an external remote terminal,
      transmit information requested by a user about the external storage medium and a list of backup target files of the external storage medium to be displayed by the external remote terminal in response to a user selection of the backup target files,
      back up the backup target files from the external storage medium to the optical storage device in response to checking an existence and a status of the external storage medium, a status of the optical storage device, and a status of a storage space inside the optical storage device, while simultaneously comparing a size of the target files and a capacity of the optical storage device, and in response to an external remote control operation,
      transmit a result of the simultaneous comparison to a wireless terminal to be displayed on the external remote terminal in response to the simultaneous comparison,
      receive a backup start message from the interface module,
      store the backup target files of the external storage medium, and
      transmit a result of the backup target file storage to the wireless terminal to be displayed by the external remote terminal; and
   a communication unit configured to receive a request command and to determine whether the request command is in a form that is capable of being processed by the optical backup apparatus or the external storage medium, and to convert the request command into a processable command in response to the request command not being in a form that is capable of being processed by the optical storage device or the external storage medium.

9. The optical backup apparatus of claim 8, wherein the optical storage device comprises an optical disc drive.

10. The optical backup apparatus of claim 8, wherein the communication unit comprises at least one of a wired module and a wireless module.

11. The optical backup apparatus of claim 10, wherein the interface module is further configured to support a flash memory.

12. The optical backup apparatus of claim 10, wherein the wireless module is configured to support at least one of a long-range wireless protocol and a short-range wireless protocol.

13. An optical backup apparatus configured to externally and remotely control back up data and configured to communicate with a remote terminal, comprising:
    an optical disc drive;
    an interface module configured to connect with a type of external storage medium;
    a control unit configured to
    accept a connection in response to a login request from the remote terminal,
    transmit information requested by a user about the external storage medium and a list of backup target files of the external storage medium to be displayed by the remote terminal in response to a user selection of the backup target files,
    perform a control operation related to a status of the optical disc drive and a status of the external storage medium; and
    a communication unit configured to exchange information between the control unit and the remote terminal, and to determine whether a request command is in a form that is capable of being processed by the optical disc drive or the external storage medium, and to convert the request command into a processable command in response to the request command not being in a form that is capable of being processed by the optical disc drive or the external storage medium,
    wherein in response to a signal from the control unit based on the results of the control operation and in response to a check of an existence and the status of the external storage medium, the status of the optical disc drive, and a status of a storage space inside the optical disc drive, with a simultaneous comparison between a size of target files and a capacity of the optical disc drive, the remote terminal is configured to control the control unit to back up the backup target files from the external storage medium to the optical disc drive.

14. The optical backup apparatus of claim 13, wherein the communication unit comprises at least one of a wired module and a wireless module.

15. The optical backup apparatus of claim 13, wherein a wireless module is configured to support at least one of a long-range wireless protocol and a short-range wireless protocol.

16. The optical backup apparatus of claim 14, wherein the wireless module is configured to support at least one of a long-range wireless protocol and a short-range wireless protocol.

17. The optical backup apparatus of claim 13, wherein the remote terminal comprises an application to control the backup of the target files.

18. The optical backup apparatus of claim 13, wherein the interface module is further configured to support a flash memory.

19. A method of optically backing up data, the method comprising:
    accepting a connection in response to a login request from a remote controller;
    controlling a control unit connected to the remote controller via a wired or wireless connection;
    transmitting information requested by a user about an external storage device and a list of backup target files of the external storage device to be displayed by the remote controller in response to a user selection of the backup target files;
    operating an optical disc drive by using the control unit;
    backing up the backup target files from the external storage device to the optical disc drive in response to checking an existence and a status of the external storage device, a status of the optical disc drive, and a status of a storage space inside the optical disc drive, while simultaneously comparing a size of the target files and a capacity of the optical disc drive, and in response to an external remote control operation, wherein the external storage device connects to the control unit via a wired connection;
    transmitting a result of the simultaneous comparison to a wireless terminal to be displayed on the remote controller in response to the simultaneous comparison;
    receiving a request command and determining whether the request command is in a form that is capable of being processed by the optical disc drive or the external storage device, and converting the request command into a processable command in response to the request command not being in a form that is capable of being processed by the optical disc drive or the external storage device;
    receiving a backup start message;
    storing the backup target files of the external storage device; and
    transmitting a result of the backup target file storage to the wireless terminal to be displayed by the remote controller.

20. The method of claim 19, wherein the remote controller and the control unit are connected over a long-range wireless protocol or a short-range wireless protocol.

21. The method of claim 19, wherein the remote controller comprises an application to control the backup of the target files.

22. The method of claim 20, wherein the remote controller comprises an application to control the backup of the target files.

23. The method of claim 19, wherein the external storage device connects to the control unit via an interface module of a flash memory.

24. The method of claim 20, wherein the external storage device connects to the control unit via an interface of a flash memory.

25. The method of claim 21, wherein the external storage device connects to the control unit via an interface of a flash memory.

26. The method of claim 22, wherein the external storage device connects to the control unit via an interface of a flash memory.

* * * * *